Nov. 17, 1970    M. L. GREENBERG    3,540,318
TRANSFER PALLET SYSTEM

Filed Nov. 22, 1968    8 Sheets-Sheet 1

INVENTOR.
MYRON L. GREENBERG
BY
Barnes, Kisselle, Raisch & Choate
ATTORNEYS

Nov. 17, 1970  M. L. GREENBERG  3,540,318
TRANSFER PALLET SYSTEM
Filed Nov. 22, 1968  8 Sheets-Sheet 2

INVENTOR.
MYRON L. GREENBERG
BY
Barnes, Kisselle, Raisch & Choate
ATTORNEYS

Nov. 17, 1970  M. L. GREENBERG  3,540,318
TRANSFER PALLET SYSTEM

Filed Nov. 22, 1968  8 Sheets-Sheet 3

INVENTOR.
MYRON L. GREENBERG
BY
Barnes, Kisselle, Raisch & Choate
ATTORNEYS

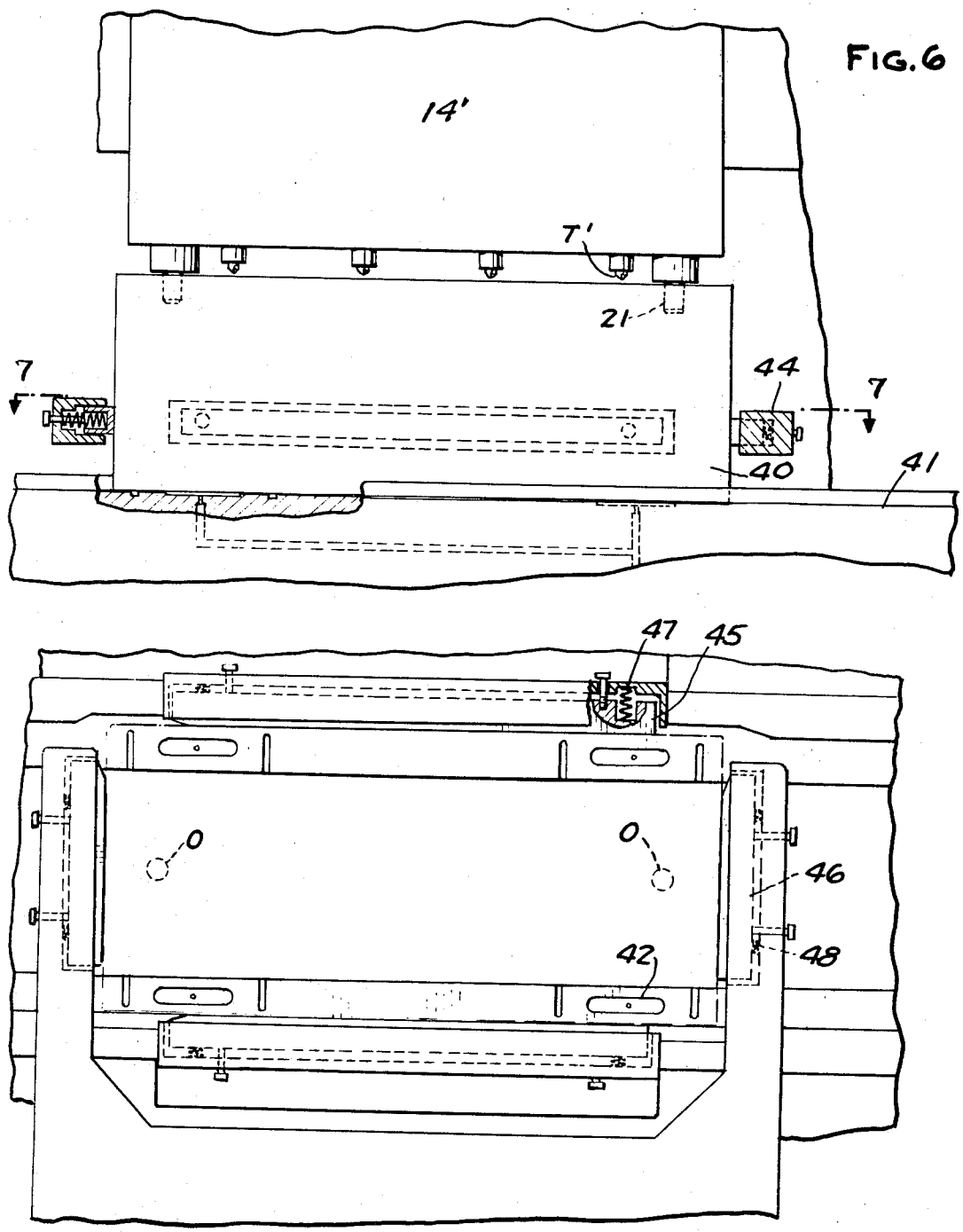

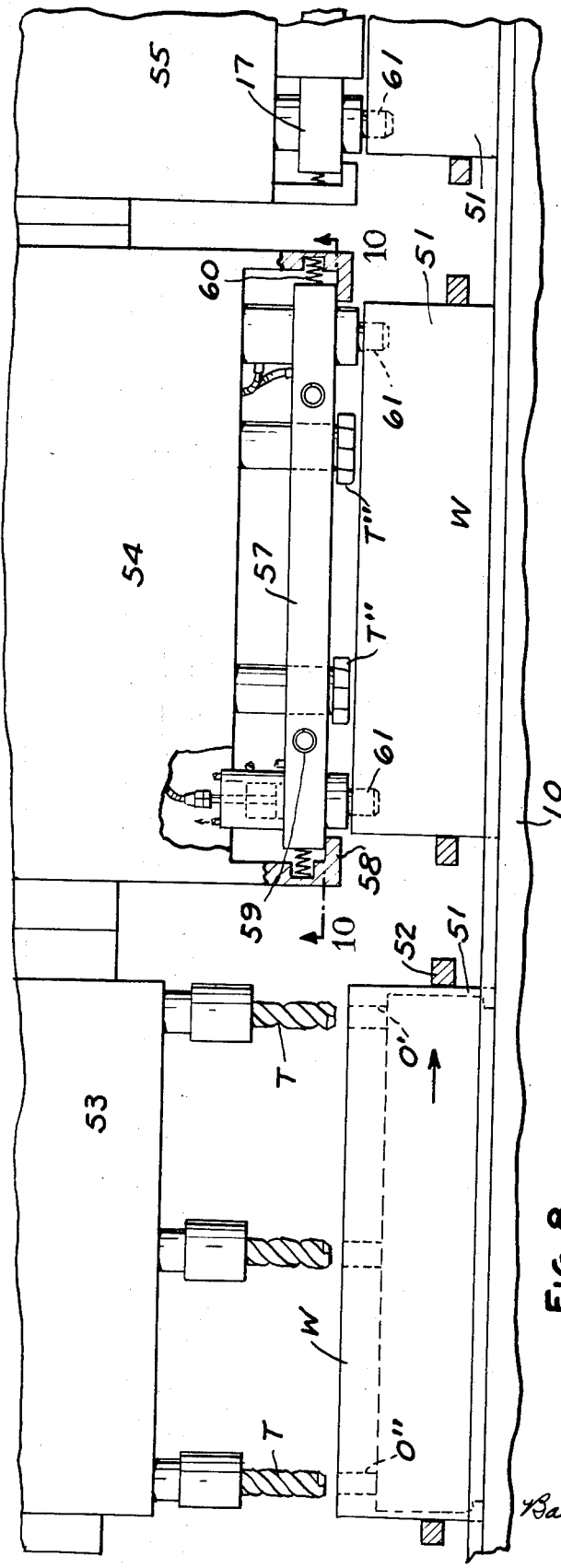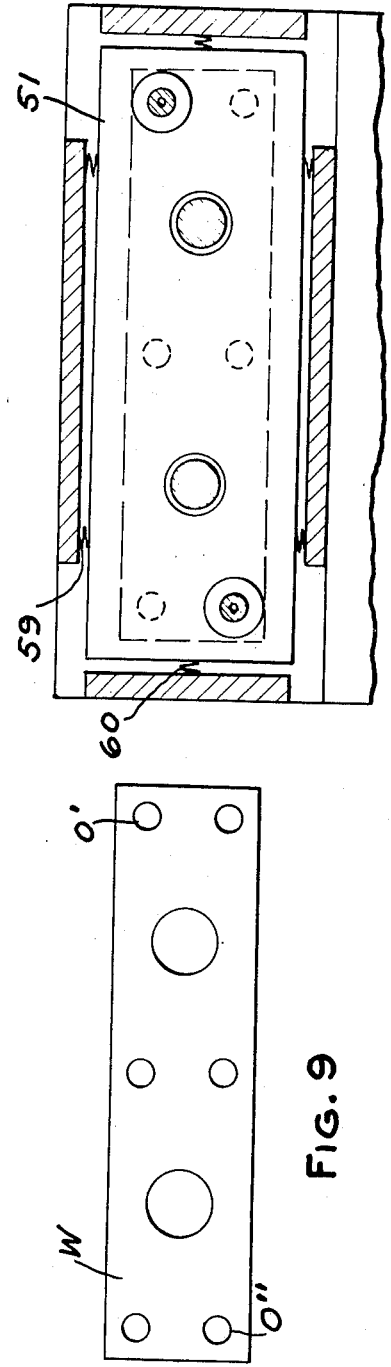

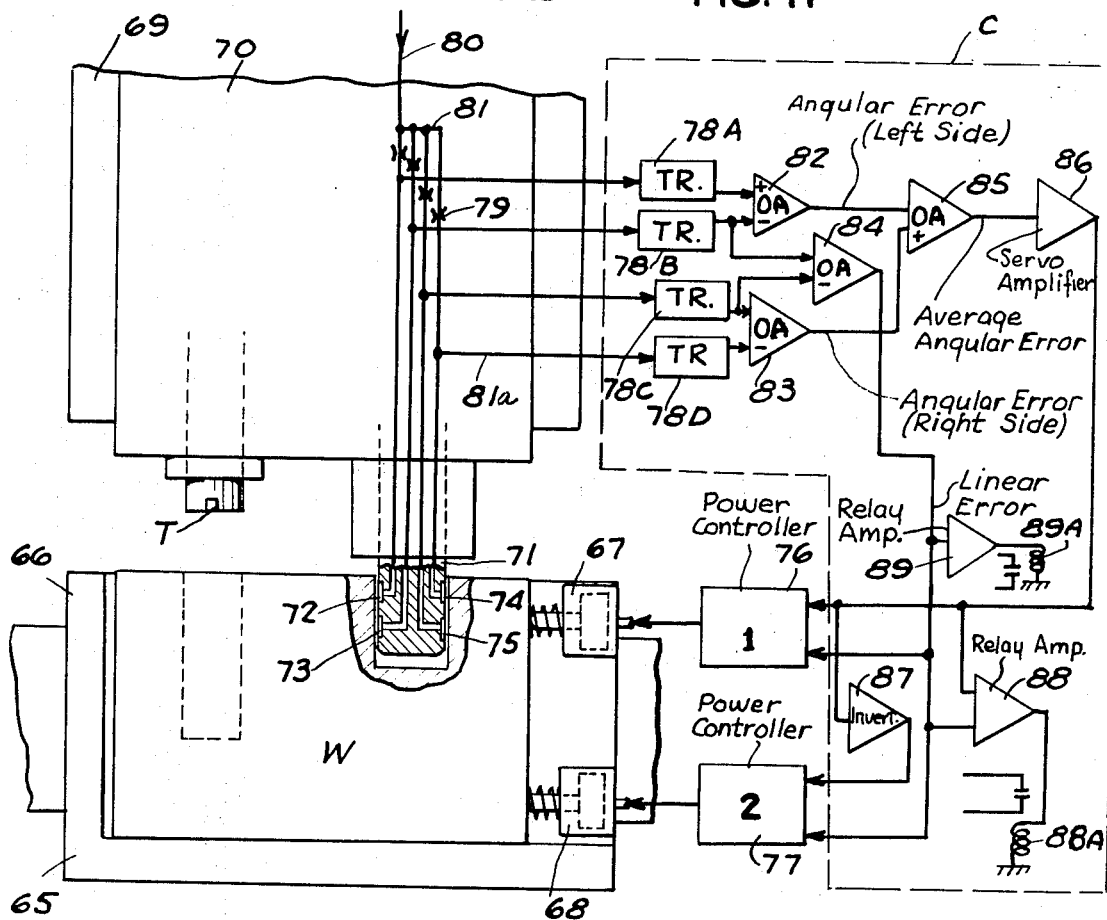
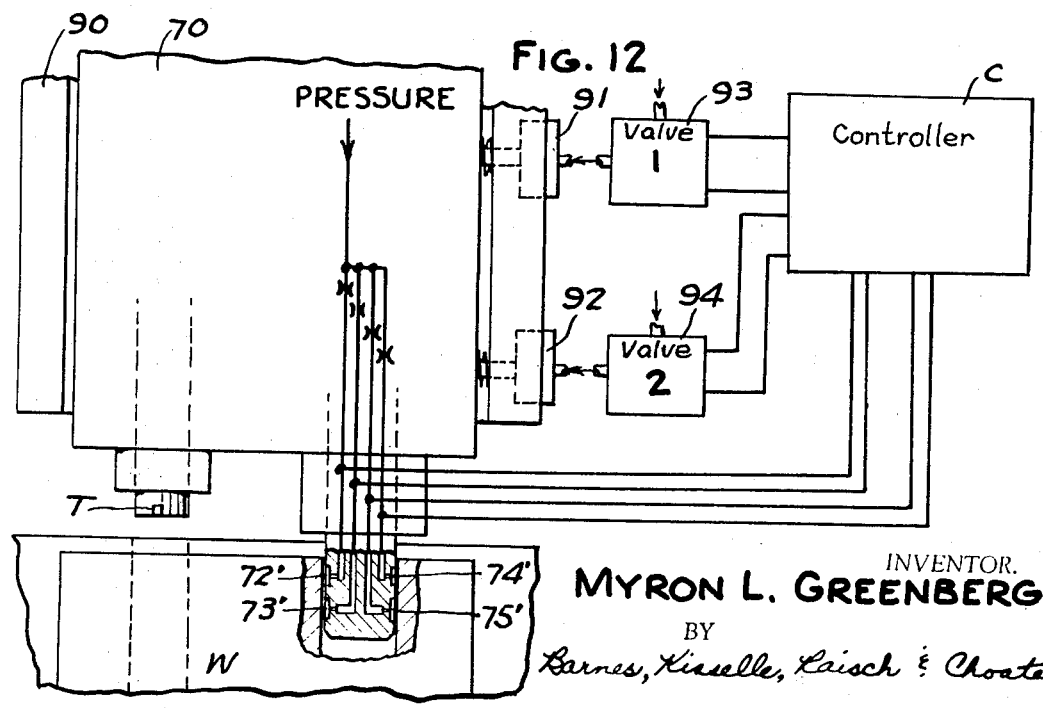

Nov. 17, 1970   M. L. GREENBERG   3,540,318
TRANSFER PALLET SYSTEM
Filed Nov. 22, 1968   8 Sheets-Sheet 7
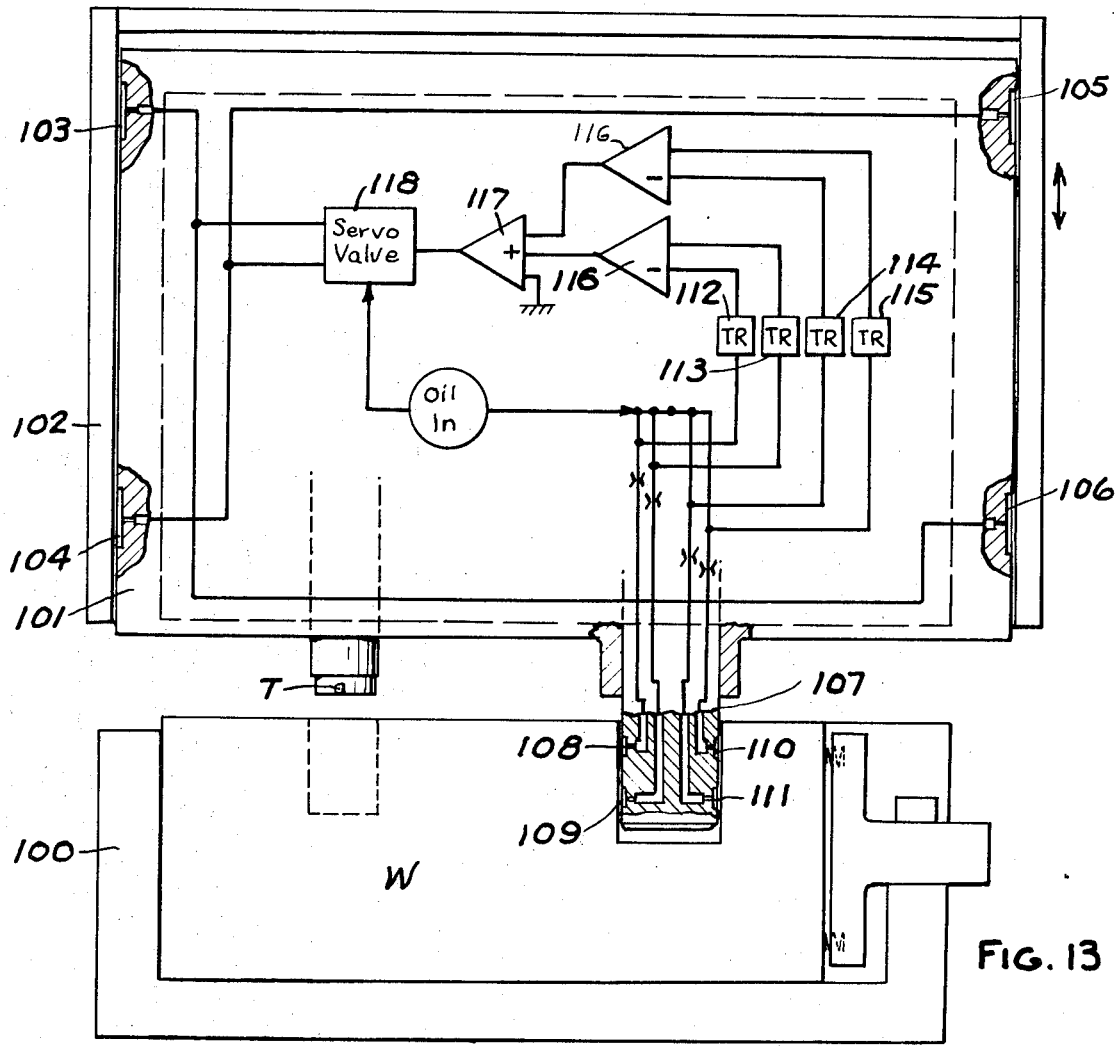
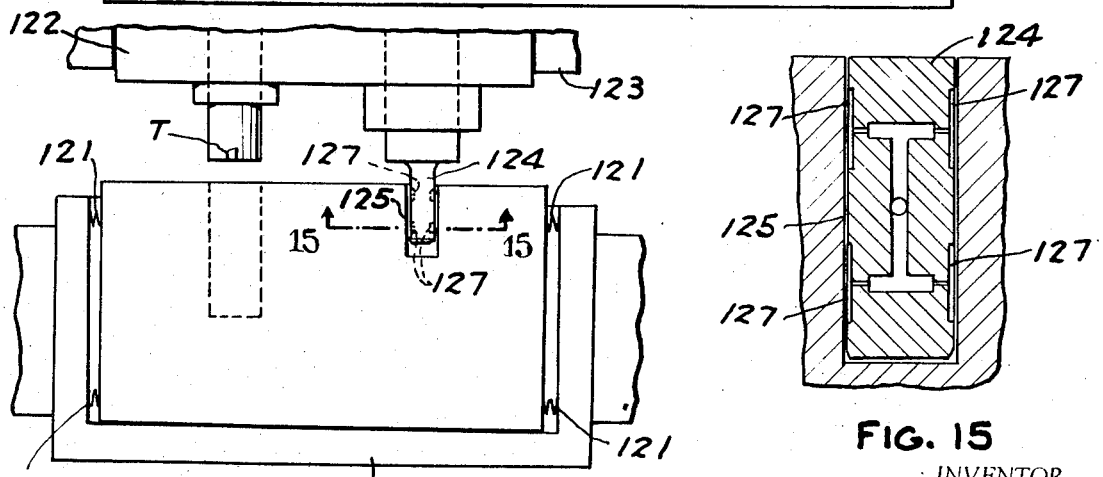
INVENTOR.
MYRON L. GREENBERG
BY
Barnes, Kisselle, Raisch & Choate
ATTORNEYS United States Patent Office 3,540,318
Patented Nov. 17, 1970

3,540,318
TRANSFER PALLET SYSTEM
Myron L. Greenberg, Union Lake, Mich., assignor to The Babcock & Wilcox Company, New York, N.Y., a corporation of New Jersey
Filed Nov. 22, 1968, Ser. No. 778,051
Int. Cl. B23b 39/00
U.S. Cl. 77—1
22 Claims

ABSTRACT OF THE DISCLOSURE

The transfer pallet system described herein comprises a plurality of pallet or work support members that are movable through a series of work stations. At one of the stations, at least two accurately formed openings are provided in the workpiece. At succeeding stations, locating pins are introduced into the openings in the workpiece. Either the support for the locating pins and associated cutting tools or the workpiece support member is perpendicular to the slide travel direction at the succeeding stations so that when the locating pins are projected into the workpiece, the workpiece becomes aligned in predetermined relation to other tools at said succeeding stations. Each of the locating pins is provided with a plurality of circumferentially spaced pressure pads and a restrictor is associated with each pressure pad. When fluid under pressure is provided to each pressure pad and the pins are introduced into the opening of the workpiece, the workpiece is accurately located longitudinally and transversely without metal-to-metal contact between the pin and the workpiece.

---

This invention relates to transfer pallet systems wherein various work operations are performed on a workpiece at succeeding stations.

BACKGROUND OF THE INVENTION

In the performance of a plurality of work operations on a workpiece, it is common to move the workpiece through succeeding stations on workpiece support members called pallets and to interrupt the movement of the pallets at each station to perform a work operation on the workpiece. Another method is to move the workpiece by itself on a transfer bar, from one station to another. This is called a free transfer system and does not employ pallets. In either case, the longitudinal and transverse positioning of each pallet or workpiece at a station is exceedingly important in order to achieve proper performance of the workpiece operation.

These processes have always been subject to limitations which result from the inability of transfer mechanisms of whatever geometry to position the workpiece at the same location each time; causing the precision locating devices to wear excessively, and from inherent inaccuracy in the precision locators themselves. On most present operations of a sequential type the accuracy available is adequate or nearly adequate so that the part can be made satisfactorily, even if the stations must be aligned and maintained more frequently than is desirable or convenient. However, the trend to greater precision of part manufacture, which imposes continually more stringent requirements on the machining and inspection equipment, is forcing the industry to perform final operations on secondary machines unless more precise location means can be devised.

In the U.S. Pat. 3,317,008 dated May 2, 1967, entitled "Indexing and Positioning System," by Gordon H. Porath and Robert J. Kielas, having a common assignee with the present application, there is disclosed and claimed a novel indexing and positioning system wherein locating pins or other elements of various shapes are provided that have circumferentially spaced pressure pads and associated restrictors to which fluid under pressure is supplied so that when the pin is projected into an opening in the workpiece or pallet, the workpiece or pallet are not only located by the pin but metal-to-metal contact between the workpiece or pallet and the pin is obviated thereby producing an accurate positioning system.

The effect of the locating system described in the above patent is to permit very accurate location with respect to a number of reference holes. The present application is directed to a system in which either the tool or the workpiece is floating instead of rigidly clamped on at least one axis so as to take advantage of the extreme accuracy of hydrostatic location in performing further operations.

Another problem that is frequently encountered, even when the finish operation is to be done on a secondary machine such as a precision boring machine is that the part must be unclamped from the pallet, in the case of a pallet machine, and clamped into the fixture of the secondary machine. If great care and a certain amount of good fortune are not employed, the register between the reference locating surface and the axis of the next operation can be lost, resulting in inaccuracies in the finished part. It is clear that, if the part does not have to be moved to another machine, this limitation on accuracy can be avoided.

Among the objects of the invention are to provide a pallet system wherein accurate positioning of the workpiece is insured at each succeeding station with respect to work performed at a preceding station to allow precision operations to be performed on a transfer or other sequential machine instead of on a secondary machine, to increase life and accuracy of the locating devices on a machine of this type, and to decrease the probability of loss of register of part location in the fixturing; with associated inaccuracies in the finished parts.

SUMMARY

The transfer pallet system described herein comprises a plurality of pallet or work support members that are movable through a series of work stations. At one of the stations, at least two accurately formed openings are provided in the workpiece. At succeeding stations, locating pins are introduced into the openings in the workpiece. The locating pins may be rotationally at rest or may be rotating as in nose pieces or outer shell guides on workpieces. Either the support for the locating pins or the workpiece support member is laterally movable at the succeeding stations so that when the locating pins are projected into the workpiece, the workpiece becomes aligned in predetermined relation to other tools at said succeeding stations. Each of the locating pins is provided with a plurality of circumferentially spaced pressure pads and a restrictor associated with each pressure pad. When fluid under pressure is provided to each pressure pad and the pin is introduced into the opening of the workpiece, the workpiece is accurately located longitudinally and transversely without metal-to-metal contact between the pin and the workpiece.

DESCRIPTION OF THE DRAWINGS

FIG. 6 is a part sectional longitudinal view of a modified form of the invention.

FIG. 7 is a fragmentary sectional view taken along the line 7—7 in FIG. 6.

FIG. 8 is a part sectional fragmentary longitudinal view of a further modified form of the invention.

FIG. 9 is a plan view of the workpiece utilized in the apparatus shown in FIG. 8.

FIG. 10 is a fragmentary sectional view taken along the line 10—10 in FIG. 8.

FIG. 11 is a partly diagrammatic part sectional view of a further modified form of the invention.

FIG. 12 is a part sectional partly diagrammatic view of a further modified form of the invention.

FIG. 13 is a part sectional partly diagrammatic view of a further modified form of the invention.

FIG. 14 is a fragmentary view of a further modified form of the invention.

FIG. 15 is a fragmentary sectional view taken along the line 15—15 in FIG. 14.

DESCRIPTION

Referring to FIGS. 1–4, the transfer pallet system embodying the invention comprises a base 10 defining a track along which workpiece support members or pallets 11 are moved by transfer members 12 beneath tools at succeeding stations 13, 14, 15.

Figure 1:
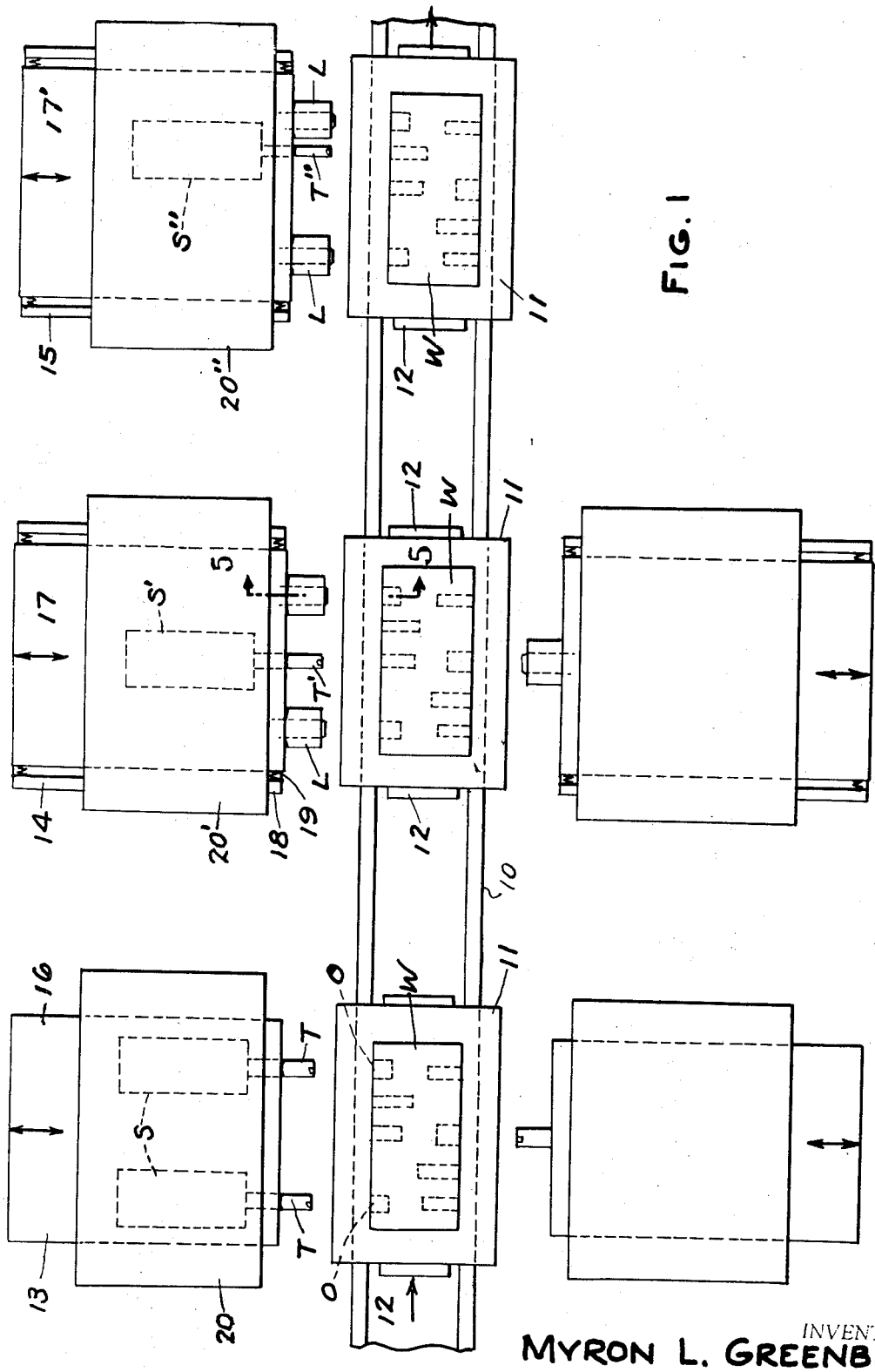
FIG. 1 is a schematic plan view of a transfer pallet system embodying the invention.
Figure 2:
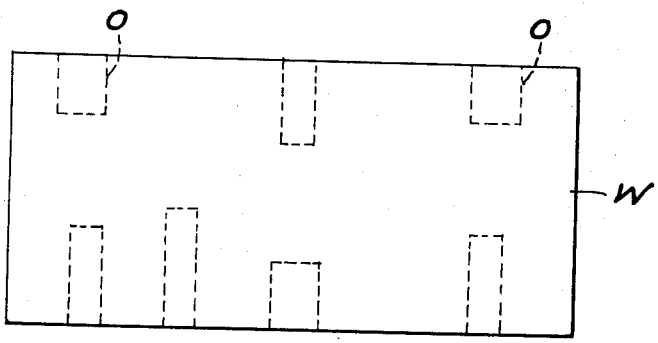
FIG. 2 is a plan view of a typical workpiece at the first station.
Figure 3:
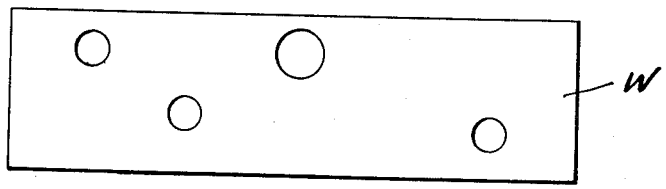
FIG. 3 is a side elevational view of the typical workpiece shown in FIG. 2.
Figure 4:
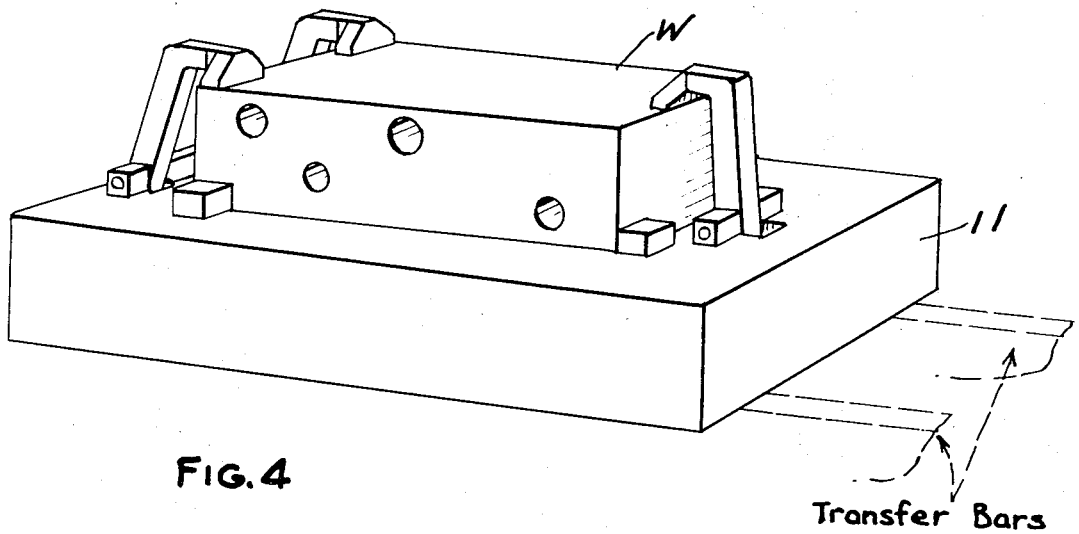
FIG. 4 is a perspective view of the workpiece shown in FIGS. 2 and 3 mounted on a pallet.

Each pallet 11 supports a workpiece W held in fixed position on pallet 11 by clamps (FIG. 4). At the first station, at least two tools T driven by spindles S are provided on the platen 20 of tool support slide 16 to perform work operations on the workpiece W and as a part of the work operations (FIGS. 2, 3) define two spaced accurately formed openings O. At the second and succeeding stations, tools T', T'' etc. and spindles S', S'', etc. are supported on bases 14, 15, etc. by slide platens 20', 20'', etc. on supports 17, 17' for movement longitudinally and transversely with respect to the pallet 11 when the pallet is in position at the station. Specifically, the support 17 is supported between flanges 18 and is yieldingly urged toward a center position by springs 19. The support 17 and slide platen 20' form a slide unit which moves in and out perpendicular to the transfer direction and parallel to the location and tool axes.

Figure 5:
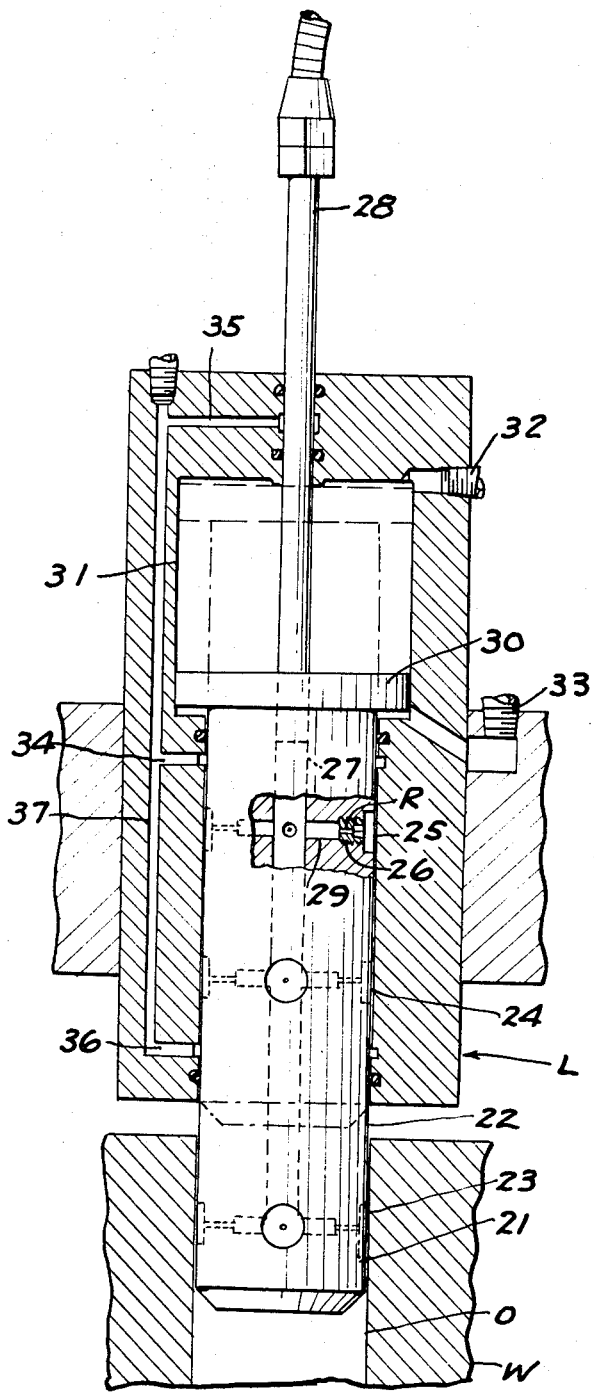
FIG. 5 is a fragmentary sectional view taken along the line 5—5 in FIG. 1.

The slide platen 20' also supports movable locating pin assemblies whose moving elements 21 are projected into the openings O in the workpiece (see FIG. 5). Since the tool support 17 is movable longitudinally, the pins 21 when projected into the openings O move the tool support 17 and, in turn, the tools T' to position them accurately with respect to the previously formed openings O in the workpiece W. The tools T' can then be actuated to perform the desired work operation at the second station 14. Similarly, when the pallet 11 is moved to the third station 15, locating pins 21 at the third station are projected to locate the tool support relative to the workpiece, the pins 21 being supported by a longitudinally and laterally movable tool support member 17' to thereby locate the tools T'' with respect to the workpiece.

Each locating pin 21 is formed as shown in FIG. 5 and comprises a cylindrical outer surface 22 having longitudinally spaced series of circumferentially spaced pressure pads 23, 24, 25 therein. Each pressure pad has an associated restrictor R in the form of, for instance, a capillary tube mounted in a screw 26 threaded into the opening. An axial opening 27 is provided in the pin 21 and an inlet pipe 28 is connected thereto for supplying fluid under pressure to the axial opening 27 from which the fluid can flow through radial passages 29 to each of the pressure pads. The locating pin 21 is movable axially by a piston arrangement which includes a piston 30 on the upper end of the pin 21 that operates within a cylinder 31. Fluid can be supplied above or below the piston 30 through openings 32, 33 to move the piston on the pin 21 downwardly or upwardly. Drain passages 34, 35, 36 are provided which connect to a common outlet 37 for draining the fluid supplied to the pressure pads.

The fluid supplied to the pressure pads is preferably liquid so that when the fluid is supplied, it flows in a thin film between the surface 22 and the surface of opening O on the workpiece and thereby holds the workpiece in predetermined relation. The pressure pads 24, 25 function to hold the pin in predetermined relation to its support so that there is no wear between the pin and the support.

In the form of the invention shown in FIGS. 6 and 7, the workpiece support member or pallet, rather than the tool support, is movable longitudinally and transversely with respect to the tool support 14' to provide the necessary relative movement between the pallet and the tool support for alignment. As shown in FIGS. 6 and 7, the workpiece support member or pallet 40 is supported on the base 41 by a plurality of pressure pads 42, each of which has an associated restrictor so that the pallet is held out of metal-to-metal contact with the base.

In this form of the invention, the pins 21 and associated tools T', which move downwardly, at the second or succeeding stations 14' are laterally fixed and the locating members 44 that engage the pallet 40 have mounted therein yieldingly supported movable members 45, 46 that are yieldingly urged outwardly by springs 47, 48 so that at the station the pallet is movable laterally, that is, longitudinally and transversely with respect to the tool. Thus, when the pins 21 which are of the type shown in FIG. 5 are projected inwardly, they engage the openings O in the workpiece, which openings have been previously formed in the workpiece at the first station, and since the workpiece is on a movable pallet, the pallet is caused to take an accurate position with respect to the tools T'.

In the form of the invention shown in FIGS. 8–10, the tool supports 53, 54, 55 are movable downwardly toward the workpieces 51 which are held at each station by transfer bars 52. At the second station, the tools T'' are supported on a tool support 57 which is mounted on horizontal flanges 58 and yieldingly urged toward a central position by springs 59, 60 so that the tool support 57 is movable longitudinally and transversely with respect to the workpiece. The tool support 57 not only supports tools T'' but in addition supports locating pins 61 similar to the pins 21 shown in FIG. 5 which enter previously drilled openings O'' in the workpiece to locate the workpiece in proper position for operation of the tools T''. Similarly, at the next station, the tool support 55 has the tools and locating pins mounted thereon in the same fashion.

It can thus be seen that in the several forms of the invention heretofore described, the workpiece is formed with holes at a first station which are thereafter utilized at successive stations to accurately locate the workpiece by causing locating pins with hydrostatic pressure pads to enter the locating openings. At each successive station, either the workpiece or the tool support and locating pin support can be movable laterally and longitudinally to provide the necessary movement.

In the form of the invention shown in FIG. 11, the workpiece W is supported by a workpiece support 65 at each station. The support 65 is provided with an abutment or stop 66 against which the workpiece W is forced by actuators 67, 68 (which may be fluid or electrically operated). At the second and successive stations, the tool base 69 supports the tool support 70 for movement toward and away from the workpiece to bring the tool T into position for operation on the workpiece. In addition, the tool support 70 supports one or more locators 71. Each locator has pressure pads 72, 73, 74, 75 lying in substantially the same diametral plane of the locator 71. Pads 72, 73 are longitudinally spaced relative to one another as are pads 74, 75. Fluid lines 81a extend exteriorly from each of the pressure pads to a controller C. Input fluid enters at 80 and is distributed at 81 to individual restrictors 79 which feed pads 72, 73, 74 and 75, so that the lines 81a supply the controller with fluid at actual pad pressure.

The controller C senses the pressure in each of the pressure pads and operates power controllers 76, 77 that control the actuators 67, 68 to accurately position the workpiece on the work support. Specifically, the controller C includes transducers 78 individual to each of the pressure pads 72, 73, 74, 75. The outputs of one pair of transducers 78A and B are subtracted in an operational amplifier 82 while the outputs of the other pair of transducers, 78C and D are subtracted in operational amplifier 83. Also the output of transducers 78B and 78C are added in an operational amplifier 84. The operational amplifier 82 has an output signal corresponding to the angular error between the workpiece and the locator on the left side as viewed in FIG. 11, while the operator amplifier 83 has a signal corresponding to the angular error on the right side. The outputs of the operational amplifiers 82, 83 are connected to an operational amplifier 85 that adds these signals and produces an average indicated angular error signal which is connected to a servo amplifier 86 which drives power controllers 76 directly and 77 through an inverter 87. The output of the operational amplifier 84 represents the error in linear position. It drives power controllers 76 and 77 in phase, while the angular error signal drives them out of phase, so as to be able to correct for both kinds of location error. The circuit further includes relay amplifiers 88 and 89 that are so filtered as to detect null signals from servo amplifier 86 and from operational amplier 84 to energize relays 88A and 89A to produce cotnact closures when the workpiece is in proper position.

The apparatus shown in FIG. 11 is thus utilized to accurately position the workpiece W with respect to the tool T. It will be understood that in this, as in all subsequent embodiments, the principle can be used in any plane, or simultaneously in several planes for three dimensional positioning.

In the form of the invention shown in FIG. 12, a similar circuit is utilized for moving the tool support 70' relative to the workpiece W to accurately locate the tool T. In this form, the tool support 70 is urged against a stop 90 by fluid motors 91, 92, each of which is controlled by a respective valve 93, 94. The valves are, in turn, controlled by a controller C' similar to that shown in FIG. 11 which receive the fluid pressure signals from the pressure pads 72', 73', 74', 75'.

In the form of the invention shown in FIGS. 13-15, the workpiece W is mounted on a work support 100 and clamped thereon. The tool support 101 at each station is supported on a base 102 by hydrostatic pressure pads 103, 104, 105, 106 so that the tool support may move and be supported by the hydrostatic pressure pads which have associated restrictors. The tool support 101 supports one or more tools T and one or more locators 107, each of which has pressure pads 108, 109, 110, 111 lying in a diametral plane as in the form of the invention shown in FIGS. 11 and 12. Transducers 112, 113, 114, 115 are associated with each of the pressure pads 108–111 and amplifiers 115, 116 are provided for measuring the angular error between the pressure pads as in the previous forms of the invention. The right and left hand angular signals are then provided to summer 117 which controls a servo valve 118 for, in turn, controlling the pressure to the pressure pads 103–106.

In the form of the invention shown in FIG. 14, the workpiece W is supported on a tool support 120 for floating relationship thereto by springs 121. The tool support 122 is slidable in a tool base 123 and supports one or more tools and one or more locators 124. The locator 124 is generally rectangular and is movable into and out of a slot 125 in the workpiece W. The locator has pressure pads 126, 127 and associated restrictors in the faces thereof for cooperating with the sides of the slot 125 to accurately locate the workpiece relative to the tool support and, in turn, the tool.

Figure 16:
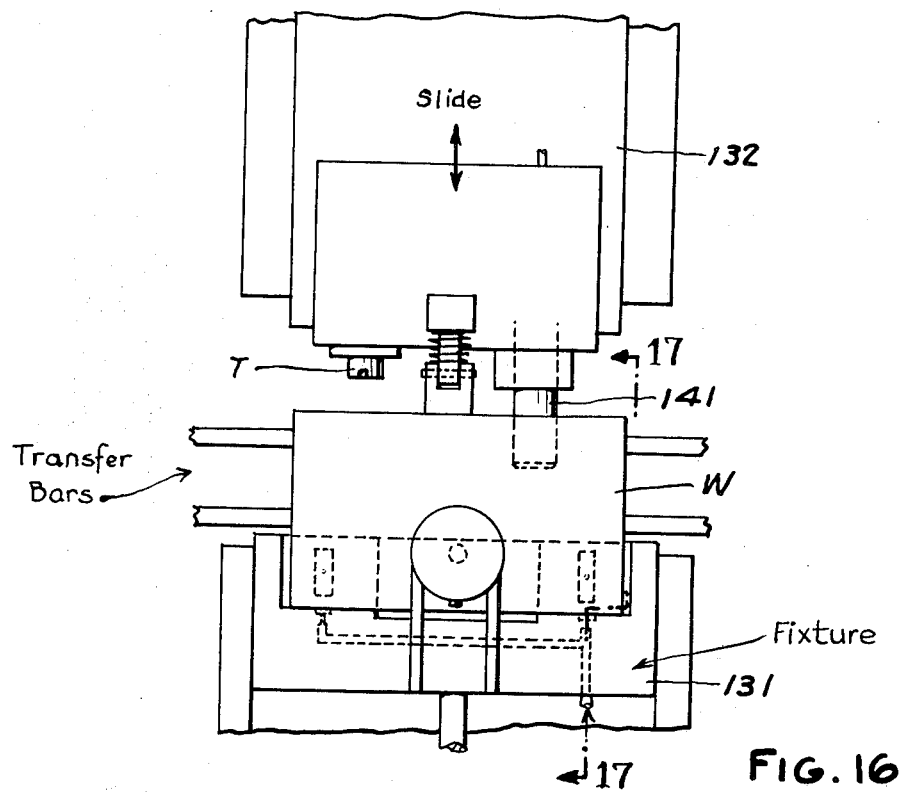
FIG. 16 is a fragmentary plan view of a further modified form of the invention.
Figure 17:
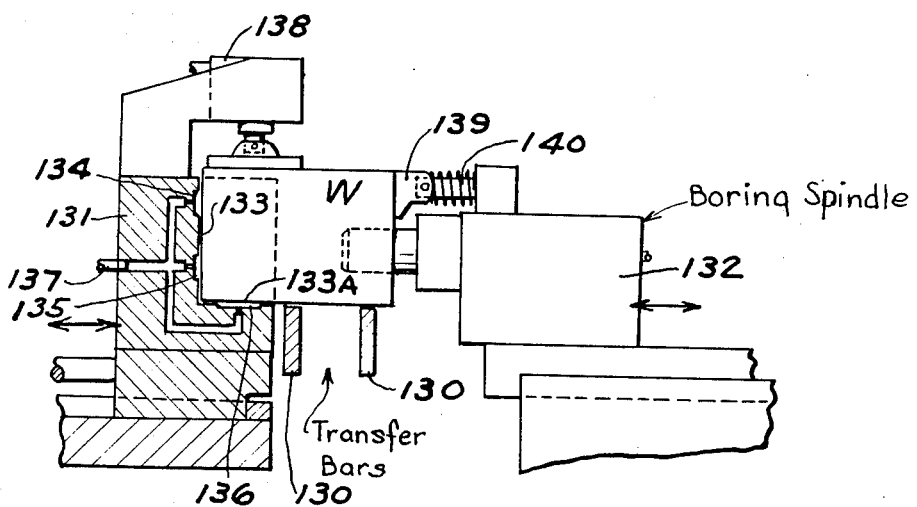
FIG. 17 is a fragmentary sectional view taken along the line 17—17 in FIG 16.

In the form of the invention shown in FIGS. 16 and 17, the workpiece W is supported for movement between stations by a transfer bar structure 130 such as is well known in the prior art. At each succesive station beyond the first station, oppositely disposed slides 131, 132 are provided which may be actuated by hydraulic cylinders. One of the slides 131 supports a work support having right angularly related surfaces 133, 133A, each of which is provided with pressure pads 134, 135, 136 and associated restrictors to which fluid under pressure is supplied through a line 137. A hydraulic cylinder 138 is provided to force the workpiece downwardly against the pressure pads 136. The slide 132 supports tool support 139 which has a spring loaded plunger 140 thereon for forcing the workpiece against the pressure pads 134, 135. The tool support 139 includes a tool T and a hydrostatic locator 141 that has circumferentially and longitudinally spaced pressure pads as in the forms of the invention shown in FIG. 5.

The term "workpiece support member" as used herein is intended to cover machines wherein the workpiece is transferred between stations without the use of pallets.

What is claimed is:

1. In a transfer pallet system, the combination comprising
    a work support member,
    means for guiding the work support member along and past a plurality of work stations,
    means at said first work station for performing work on a workpiece supported by said work support member including the formation of at least two openings in said workpiece,
    a tool support at said second station,
    a pair of locating pins on said tool support at said second station,
    each said pin having a series of circumferentially spaced pressure pads therein adjacent the surface of the opening when said pin is projected into the opening of the workpiece,
    a fluid restrictor associated with each said pressure pad,
    means for directing fluid under pressure through each said restrictor to the respective pressure pad,
    and means for supporting one of said tool support and said workpiece support member at said second station for lateral movement,
    and means for holding the other of said pins and work support member laterally fixed at said second station in such a manner that when pins are moved into said openings and fluid is supplied to each said pressure pad, said workpiece and said tool support are held in predetermined relation to one another at said second station.

2. The combination set forth in claim 1 wherein said workpiece support member is laterally movable at said second station.

3. The combination set forth in claim 1 wherein said tool support member is laterally movable at said second station.

4. The combination set forth in claim 1 including a second series of circumferentially spaced pads and associated restrictors on surfaces on said pin,
    said tool support member having complementary surfaces adjacent the surfaces of said pins to provide lateral control of the position of the pins with respect to said pin support members.

5. The combination set forth in claim 1 including means for projecting said pins with respect to said tool support member toward and away from said workpiece.

6. The combination set forth in claim 1 including means responsive to the pressure in the pressure pads of said locating member for controlling the position of one of said work support and said workpiece.

7. The combination set forth in claim 1 wherein said locating member has longitudinally spaced pressure pads, said means responsive to the pressure compensating for the relative difference in pressure due to misalignment of the workpiece longitudinally of the locator.

8. In a transfer pallet system, the combination comprising
a work support member,
means for guiding the work support member along and past a plurality of work stations,
said work support member and said guide means having complementary surfaces,
a plurality of pressure pads associated with one of said surfaces,
means at said first work station for performing work on a workpiece supported by said work support member including the formation of at least two openings in said workpiece,
a tool support of said second station,
a pair of locating pins on said tool support at said second station,
each said pin having a series of circumferentially spaced pressure pads therein adjacent the surface of the opening when said pin is projected into the opening of the workpiece,
a fluid restrictor associated with each said pressure pad,
means for directing fluid under pressure through each said restrictor to the respective pressure pad,
and means for supporting one of said tool support and said workpiece support member at said second station for lateral movement,
and means for holding the other of said pins and work support member laterally fixed at said second station in such a manner that when said pins are moved into said openings and fluid is supplied to each said pressure pad, said workpiece and said tool support are held in predetermined relation at said second station.

9. The combination set forth in claim 8 wherein said workpiece support member is laterally movable at said second station.

10. The combination set forth in claim 8 wherein said tool support member is laterally movable at said second station.

11. The combination set forth in claim 8 including a second series of circumferentially spaced pads and associated restrictors on surfaces on said pin,
said tool support member having complementary surfaces adjacent the surfaces of said pins to provide lateral control of the position of the pins with respect to said pin support members.

12. The combination set forth in claim 11 including means for projecting said pins with respect to said tool support member toward and away from said workpiece.

13. The combination set forth in claim 8 including means responsive to the pressure in the pressure pads of said locating member for controlling the position of one of said work support and said workpiece.

14. The combination set forth in claim 8 wherein said locating member has longitudinally spaced pressure pads, said means responsive to the pressure compensating for the relative difference in pressure due to misalignment of the workpiece longitudinally of the locator.

15. In a transfer pallet system or the like, the combination comprising
a work support member,
means for movably supporting said work support member at a work station,
a tool support at said station,
at least one locating pin on said tool support at said station,
each said locating pin having a series of circumferentially spaced pressure pads therein adapted to be positioned adjacent the surface of an opening on the workpiece of a work support member,
a fluid restrictor associated with each said pressure pad,
means for directing fluid under pressure through each said restrictor through the respective pressure pad,
means for supporting one of said tool support and said workpiece member at said station for lateral movement,
and means for holding the other of said tool support and said workpiece support relatively fixed against lateral movement,
and means responsive to the pressure in said pressure pads for moving and locating one of said work support member and tool support member.

16. The combination set forth in claim 15 wherein said last-mentioned means comprises means moving said work support member.

17. The combination set forth in claim 15 wherein said last-mentioned means comprises means for moving said tool support.

18. The combination set forth in claim 17 wherein said last-mentioned means comprises a plurality of spaced pressure pads and associated restrictors on one of the surfaces of said tool support and a base,
and means for selectively varying the fluid supplied to said pressure pads for positioning said tool support.

19. In a transfer pallet system or the like, the combination comprising
a work support member,
means for movably supporting said work support member at a work station,
a tool support at said station,
at least one locating pin on said tool support at said station,
each said locating pin having a series of circumferentially spaced pressure pads therein adapted to be positioned adjacent the surface of an opening on the workpiece of a work support member,
a fluid restrictor associated with each said pressure pad,
means for directing fluid under pressure through each said restrictor through the respective pressure pad,
and means responsive to the pressure in said pressure pads for moving and locating one of said work support member and tool support member.

20. The combination set forth in claim 19 wherein said last-mentioned means comprises means moving said work support member.

21. The combination set forth in claim 19 wherein said last-mentioned means comprises means for moving said tool support.

22. The combination set forth in claim 21 wherein said last-mentioned means comprises a plurality of spaced pressure pads and associated restrictors on one of the surfaces of said tool support and a base,
and means for selectively varying the fluid supplied to said pressure pads for positioning said tool support.

References Cited
UNITED STATES PATENTS 3,209,623 10/1965 Schardt _____ 77—64
3,280,659 10/1966 Allen _____ 77—1

GERALD A. DOST, Primary Examiner

U.S. Cl. X.R.

77—57; 269—56